United States Patent
Palnati et al.

[19]

[11] Patent Number: 5,991,297
[45] Date of Patent: Nov. 23, 1999

[54] INDEPENDENTLY SIZABLE MEMORY PAGES FOR A PLURALITY OF CONNECTION ID TYPES IN A NETWORK SWITCH

[75] Inventors: Prasasth R. Palnati, Waltham; Mahesh N. Ganmukhi, Carlisle; David J. White, Marlborough, all of Mass.

[73] Assignee: Ascend Communications, Westford, Mass.

[21] Appl. No.: 08/919,824

[22] Filed: Aug. 28, 1997

[51] Int. Cl.[6] .................................................. H04J 14/08
[52] U.S. Cl. .......................................... 370/389; 370/400
[58] Field of Search .................................... 370/219, 220, 370/227, 228, 389, 390, 392, 395, 397, 399, 400

[56] References Cited

U.S. PATENT DOCUMENTS

| | | | |
|---|---|---|---|
| 5,303,078 | 4/1994 | Brackett et al. | 359/139 |
| 5,422,880 | 6/1995 | Heitkamp et al. | 370/400 |
| 5,430,715 | 7/1995 | Corbalis et al. | 370/395 |
| 5,602,843 | 2/1997 | Gray | 370/338 |

*Primary Examiner*—Chi H. Pham
*Assistant Examiner*—Maikhanh Tran
*Attorney, Agent, or Firm*—Weingarten, Schurgin, Gagnebin & Hayes LLP

[57] ABSTRACT

A method and apparatus are disclosed for selectively accessing and independently sizing connection identification tables within a network switch. Upon receipt of a data unit, such as an asynchronous transfer mode cell at an input port of an Input Output Module, a plurality of selection bits are inserted into the cell header which are used to select one of a plurality of connection identifiers. The VPI/VCI addresses are mapped into a connection identifier and the connection identifier is also inserted within the respective cell header. The connection identifier may comprise an unicast connection identifier, a multicast connection identifier, or a redundant unicast identifier. The unicast, multicast and redundant identifiers are either stored in separate tables at call setup and the tables are independently selectable via use of the selection bits stored within the cell header. Alternatively, the selection bits are employed to specify a register which points to the first address for the respective type of identifiers. Thus, identifiers of a particular connection type are accessible via a base address plus an offset address. In the described manner, tables or portions of tables containing connection identifiers may be flexibly and independently sized.

27 Claims, 4 Drawing Sheets

Fig. 1

User-Network Interface
(UNI)

Fig. 2a
(Prior Art)

Network-Node Interface
(NNI)

INDEPENDENTLY SIZABLE MEMORY PAGES FOR A PLURALITY OF CONNECTION ID TYPES IN A NETWORK SWITCH

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to computer network devices and more particularly to a method and apparatus for independently sizing output routing tables in a network switch.

In computer networks employing network switches, communication of information is routed through the network via network switches. In some connection based networks, such as asynchronous transfer mode (ATM) networks, communications between a source of information and a final destination are considered connections or circuits which comprise virtual paths over which the information flows. Multiple connections may utilize the same physical paths as the information flows through the network.

ATM switches typically include a plurality of ingress cards referred to as Input Modules for receiving ATM cells, a plurality of egress cards referred to as Output Modules for forwarding ATM cells over a communications link to a downstream computer network device and a switch fabric for selectively forwarding cells received at one of the ingress cards to one of the egress or output cards for transmission over the respective communication link. In some network switches, the ingress and egress functions are combined as a single Input Output Module (IO Module). Each IO Module typically has multiple ports for receiving and transmitting data units such as cells in an ATM network. Each of the ports can typically support multiple connections or circuits.

The switch fabric interconnects each ingress card with each egress card so that a cell received at any one of the ingress cards can be selectively forwarded to any one of the egress cards.

In an ATM network, the destination paths are identified by an address comprising a Virtual Path Identifier ("VPI") and a Virtual Connection Identifier ("VCI"). The VPI comprises 8 or 12 bits depending on whether the cell is configured for User-Network Interface (UNI) or Network-Node Interface (NNI) operation, respectively. The VCI comprises 16 bits. When a circuit is established at "call setup", ingress translation tables and egress translation tables are configured as an administrative function such that a cell associated with a specific connection will be properly routed through the switch and assigned a correct VPI/VCI destination address for forwarding. Due to the fact that accommodating the number of possible VPI/VCI address combinations would result in excessive and unnecessary hardware costs, typical network switches support a number of connection identifiers far less than the total number of possible identifiers. Accordingly, when a connection is established at call setup, the respective VPI/VCI address pertaining to a particular connection is mapped, within each relevant network switch, into an arbitrary connection identifier which is used within the switch to associate a received cell with the respective connection. The connection identifiers need not be the same from device to device within the network since they are used solely within the switch. More specifically, upon receipt of a cell at an Input Module, the VPI/VCI address is inspected and a connection identifier (connection ID) is assigned which may be prepended to the information payload. The connection identifier associates the VPI/VCI with the respective connection within the switch.

Cells received at a network switch are typically identified as either unicast cells or multicast cells. A unicast cell is a cell which is received at a single input port of an IO Module and is transmitted to only a single output port of an IO Module. A multicast cell is a cell which is received at a single port of an Input Module and is transmitted to at least two output ports of the network switch for forwarding. The output ports involved in a multicast transmission may be within one or more than one Output Module.

Different connection identifier types are typically employed internally within a network switch to signal how a cell is forwarded within a network switch. Unicast cells are normally assigned a Connection ID (CID) and Multicast Cells are typically identified with a Multicast Identifier (MID).

When a cell arrives at an input port of an Input Module, the VPI/VCI address is used as an index into an ingress translation table to generate the appropriate connection identifier such as a CID or a MID. After the cell is switched to the specified Output Module or Modules, the connection identifier is employed as an index into an egress translation or routing table to obtain the outgoing VPI/VCI associated with the respective connection identifier for purposes of cell forwarding.

Typical ATM switch implementations have a single memory address space that is subdivided into separate tables for the different types of circuit identifiers. For example if the total number of circuit identifiers is 64K, then the connections identifiers could be stored in tables as follows:

| | |
|---|---|
| CIDs | 0–16k-1 |
| MIDs | 16k–64k-1. |

Such an allocation scheme is undesirable since it is not readily scalable. For example, if the requirements for the number of CIDs were to grow, the assignment of additional CIDs would come at the expense of allocated MIDs. Thus, known addressing techniques for accessing egress translation tables are deficient in that they fail to permit independent sizing of output routing tables containing information for respective connection identifier types.

SUMMARY OF THE INVENTION

A method and apparatus are disclosed which permit the memory space allocated for an egress translation table for each type of connection identifier within a network switch to be sized independently of the memory space allocated to other connection identifiers. Accordingly, the memory space associated with each type of connection identifier can be increased based upon specific system needs without impacting the memory allocations for other types of connection identifiers.

In addition to the use of CIDs and MIDs, a further type of connection identifier is defined comprising a redundant unicast identifier (RID) for a type of cell identified as a redundant unicast cell. A redundant unicast cell is one that is received at a single ingress port and forwarded to two Output Modules. One of the Output Modules associated with a redundant unicast cell is active at any one time and the other Output Module is inactive. The Output Module designated as the inactive module does not forward the cell downstream for receipt by another network device. The inactive connection assignment is employed to establish a redundant unicast connection which can be activated in the event the active connection fails or is deactivated for any reason. A bit may be included in the egress translation table to designate the respective connection as active or inactive. Alternatively, two Output Modules may be employed which contain identical routing tables (i.e. the same ingress and egress translation tables) for purposes of redundancy. In such a case, all RIDs associated with one Output Module may be globally defined as active and all RIDs associated with the other Output Module may be globally defined as inactive.

Upon receipt of an incoming cell, the received VPI/VCI address is employed as an index into a lookup table known as an ingress translation table to identify the cell as one having a unicast connection identifier (CID), a multicast connection identifier (MID) or a redundant unicast connection identifier (RID) based upon information stored in respective ingress translation tables at call setup. Following the identification of the connection identifier type and the respective connection identifier, a plurality of selection bits are stored in a modified cell header, internal to the switch, to specify whether the connection identifier pertains to a unicast connection identifier (CID), a redundant unicast identifier (RID) or a multicast connection identifier (MID). The bits are employed to identify a pointer which points to the beginning of each of the respective memory spaces for the different types of connection identifiers within an output connection identifier translation table. As a result of the use of the selection bits and respective pointers to identify the respective translation tables, any number of connection identifier types and associated tables may be employed and the egress translation tables may be independently sized within a memory. Thus, should system needs dictate that the number of connection identifiers of a particular type be increased, such can be accomplished without causing the allocation of the other types of connection identifiers to shrink, assuming adequate memory capacity.

Alternatively, the selection bits may be employed to select a plurality of independently sizable memories, each of which contains an egress translation table for performing conversions from CIDs, MIDs or RIDs to the outgoing VPI/VCI destination address.

BRIEF DESCRIPTION OF THE DRAWINGS

The invention will be more fully understood by reference to the following Detailed Description of the Invention in conjunction with the drawings of which.

DETAILED DESCRIPTION OF THE INVENTION

Figure 1:
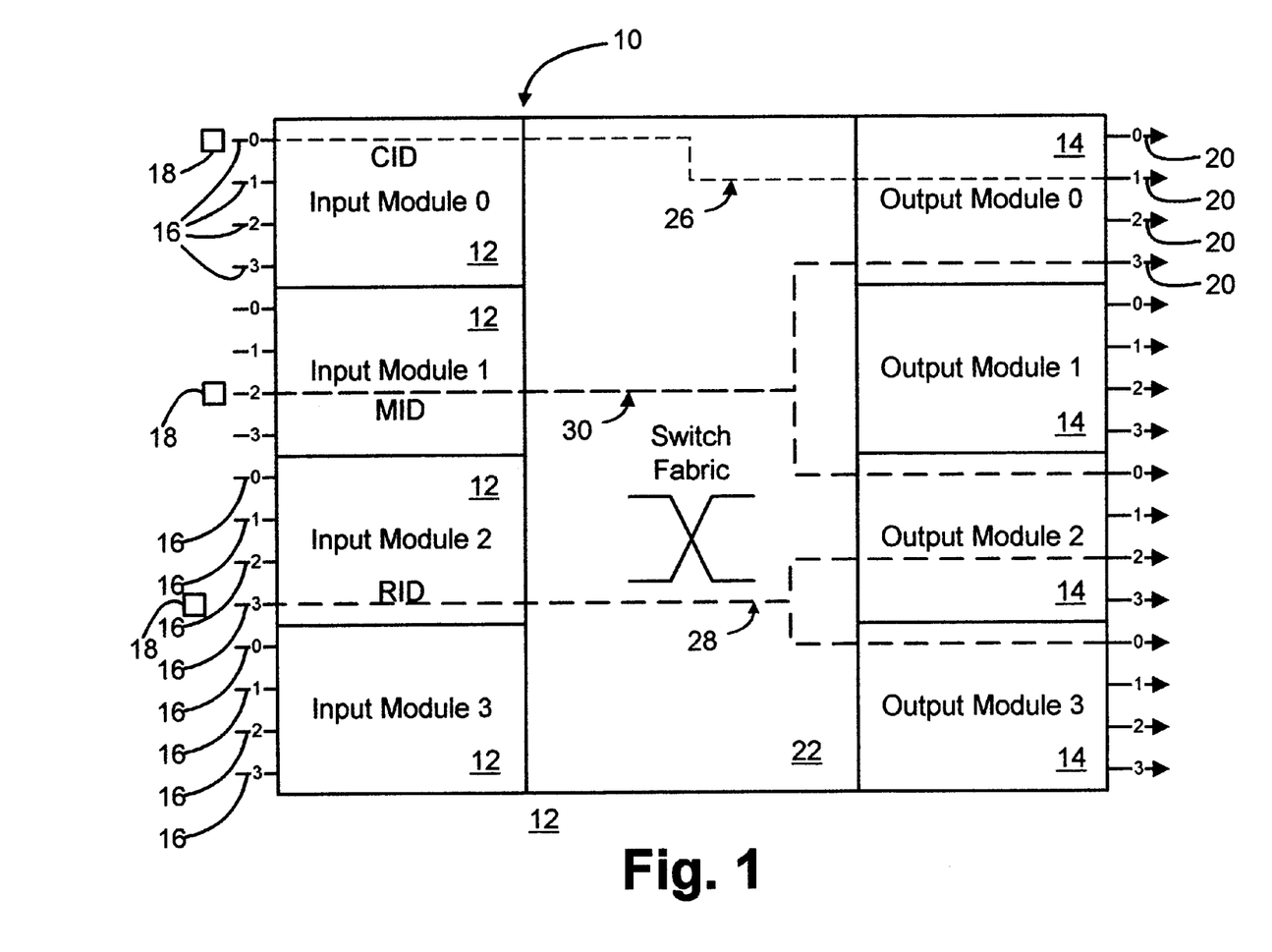
FIG. 1 is a block diagram illustrating a network switch in accordance with the present invention.

A network switch in accordance with the present invention is disclosed which permits egress translation tables contained in memory to be independently and flexibly sized. Referring to FIG. 1, a network switch 10 includes a plurality of Input Modules 12 and a plurality of Output Modules 14. Each of the Input Modules 12 includes a plurality of input ports 16 for receiving data units 18, such as Asynchronous Transfer Mode (ATM) cells, from corresponding communication links or network devices in communication with the network switch. Additionally, each Output Module 14 has a plurality of output ports 20 for forwarding data units, such as ATM cells downstream over corresponding communication links to other network devices, such as switches, routers, bridges or end stations or to other network devices in communication with the network switch 10.

Each Input Module 12 has an output for forwarding data units to a switch fabric 22 and each Output Module 14 has an input for receiving data units from the switch fabric 22 which are destined for the respective Output Module 14. The switch fabric 22 has a plurality of inputs for receiving data units from respective Input Modules 12 and a plurality of outputs for forwarding data units to selected ones of the Output Modules 14.

Each data unit 18 which is received at a port of an Input Module 12 of the network switch 10 is associated with a "connection" or "circuit" which defines communication paths between the source of information within the network and the destination or destinations for the information being conveyed. Multiple connections or circuits may be processed by any given input or output module and over any single port of any such module. When it is desired to establish a connection or circuit between a source of information and a destination, a call setup procedure is initiated which updates ingress and egress translation tables within network devices within the communication path for the respective connection to permit the respective devices to associate an appropriate connection identifier to the data unit upon its receipt and to reconstruct a header which includes the proper destination address prior to cell forwarding from the respective Output Module 14.

Figure 2A:
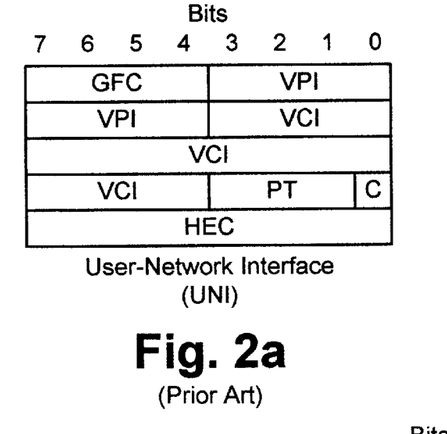
FIG. 2a is an illustration of prior art header format for a conventional ATM cell configured for User-Network Interface (UNI) operation as received at an input port of an Input Module of the network switch of FIG. 1.
Figure 2B:
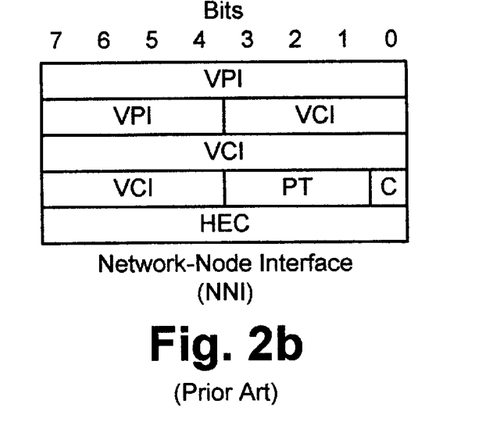
FIG. 2b is an illustration of prior art header format for a conventional ATM cell configured for Network Node Interface (NNI) operation as received at an input port of an Input Module of the network switch of FIG. 1.

The cell header format for a typical Asynchronous Transfer Mode (ATM) cell received at an input port 16 of one of the input modules 12 and as known in the art is illustrated in FIGS. 2a and 2b for ATM cells configured for User Network Interface (UNI) and Network Node Interface (NNI) operation respectively. As illustrated in FIG. 2a the cell header includes a generic flow control field (GFC) which comprises a 4 bit field, a Virtual Path Identifier (VPI) which comprises an 8 bit field and a Virtual Connection Identifier (VCI) which comprises a 12 bit field. Additionally, the cell header contains a 3 bit identification of payload type (PT), a cell loss priority bit (C) and an 8 bit header error control (HEC) field. The configuration and operation of the ATM cell header is described in more detail in the ATM Forum User Network Interface Specification (rev. 3.1) which is incorporated herein by reference.

As illustrated in FIG. 2b, the cell header configured for NNI operation is the same as the cell header configured for UNI operation with the exception that the GFC field is not used in the cell header configured for NNI operation. In the cell header of FIG. 2b, the VPI is provided as having an 12 bit length, rather than an 8 bit length as in FIG. 2a.

The VPI/VCI address constitutes the destination address over each leg in a communication network. Ingress address translation tables (not shown) contained in respective Input Modules 12 are used to translate the received VPI/VCI address within the cell header of a received cell into a connection identifier which is used internally within the network switch 10. Egress translation tables contained within the Output Modules 14 are used to obtain the outgoing VPI/VCI address (es) for the respective cell (s) based upon information contained in the cell header received at the respective Output Module 14 as hereinafter described.

Figure 3:
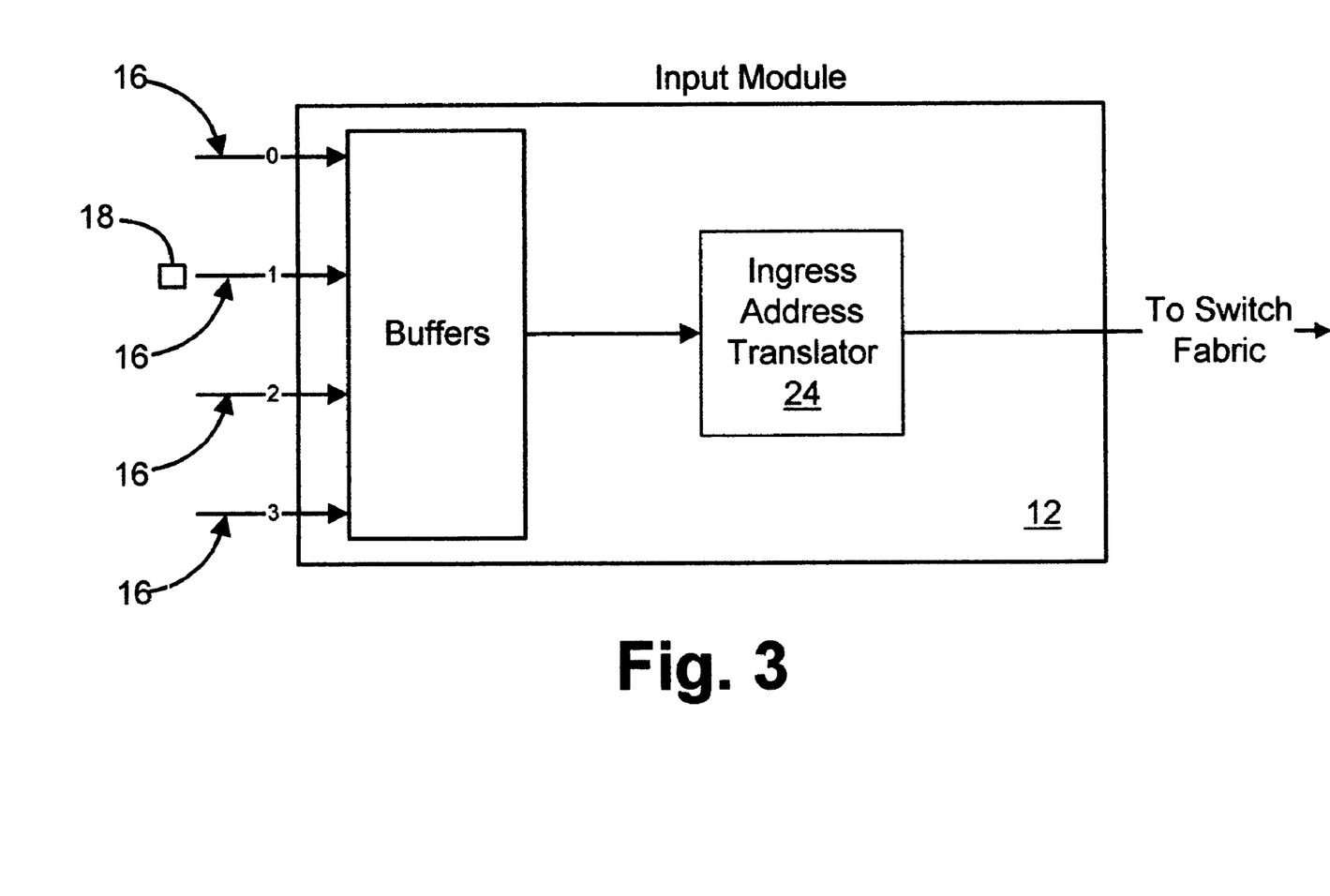
FIG. 3 is a block diagram of an Input Module illustrating an ingress address translator employed in the network switch of FIG. 1.
Figure 4:
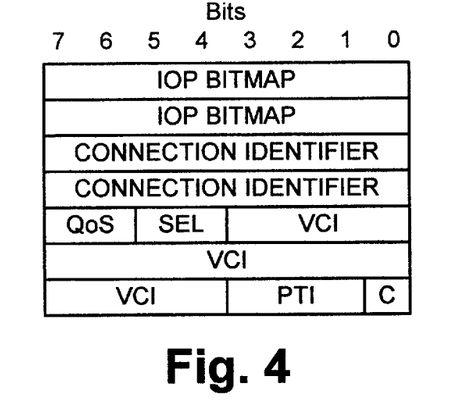
FIG. 4 is a table illustrating an internal cell header format for an ATM cell following modification of the cell header to include two bit connection identifier type selection field (SEL) and a sixteen bit connection identifier field.
Figure 5:
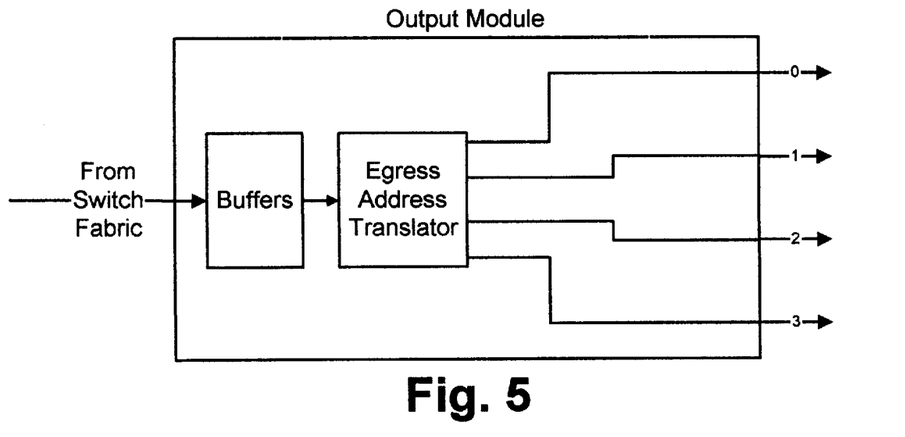
FIG. 5 is a block diagram of an Output Module illustrating an egress address translator employed in the network switch of FIG. 1.

Referring to FIG. 3, the Input Module 12 includes an ingress address translator 24 which is employed to analyze the VPI/VCI address of each received ATM cell, and to determine the connection identifier type and the connection identifier corresponding to the received VPI/VCI address based upon call setup information previously recorded in the respective ingress address translation table of the respective Input Module 12. More specifically, received cells are identified as being a unicast cell, a redundant unicast cell or a multicast cell. The ATM cell header of the received cell is modified within the respective input module 12 to include two (2) selection bits which identify the cell as being either a unicast cell, a redundant unicast cell or a multicast cell. While in the presently disclosed embodiment, three connection types are employed which may be defined by two bits, it should be appreciated that any number of connection identifier types may be employed in accordance with the present invention by use of a suitable number of selection bits within the cell header. For example, and not by way of limitation, if the received ATM cell is a unicast cell having an associated unicast connection identifier (CID), selection bits 00 are inserted within the cell header to so identify the cell, and the connection identifier (CID) associated with the received VPI/VCI address for the unicast cell is also inserted into the cell header as depicted in FIG. 4. If the received cell is a redundant unicast cell having an associated redundant unicast connection identifier (RID), selection bits 01 are inserted within the cell header to identify the cell as a redundant unicast cell and the connection identifier (RID) associated with the cell is also inserted within the modified cell header. Finally, if the received cell is identified as a multicast cell, the selection bits 10 are inserted into the cell header to identify the cell as a multicast cell along with the respective connection identifier (MID) for the multicast cell. The modified cell header, including the selection bits and the respective connection identifier, is then forwarded through the switch fabric 22 to one or more output modules 14 for forwarding downstream in the network as appropriate.

More particularly, referring again to FIG. 1, a unicast cell is depicted as being forwarded through the switch fabric 22 to a single Output Module 14 for forwarding from a single output port as illustrated by exemplary connection 26. Additionally, a redundant unicast cell having an associated redundant unicast connection identifier (RID) is depicted as being forwarded through the switch fabric 22 to Output Modules 2 and 3 as illustrated by exemplary connection 28. The redundant unicast cell is forwarded downstream by the one of the two Output Modules 14 which is designated as the active module for purposes of redundant unicast cell forwarding. The other of the two Output Modules receiving the redundant unicast cell is designated as inactive and does not forward the cell downstream.

Finally, referring to FIG. 1, a multicast cell is depicted as being forwarded to two output ports for transmission as illustrated by exemplary connection 30. More specifically, the multicast cell is illustrated as being received at port 2 of Input Module 1 and as being forwarded through the switch fabric 22 to Output Module 0 for forwarding from port 3 and to Output Module 2 for forwarding from port 0. Multicast cells may be forwarded through the switch fabric for transmission from any number of network switch output ports.

Following translation of the ATM cell header by the ingress address translator, the cell header typically includes an Output Module 14 selection bitmap, a connection identifier field, a plurality of selection bits for selecting one of a plurality of memories, or alternatively for selection one of a plurality of base offset registers, each of which contains a pointer into a single memory, QoS bits, a VCI, PTI and a cell loss priority bit as illustrated in FIG. 4. It should be appreciated that the information contained in the modified cell header may include information other than that depicted in FIG. 4 (apart from a selection bit field and a connection identifier field), may be rearranged within the modified cell header, and that the number of bits associated with the respective fields of the modified cell header may differ for different implementations.

Figure 6:
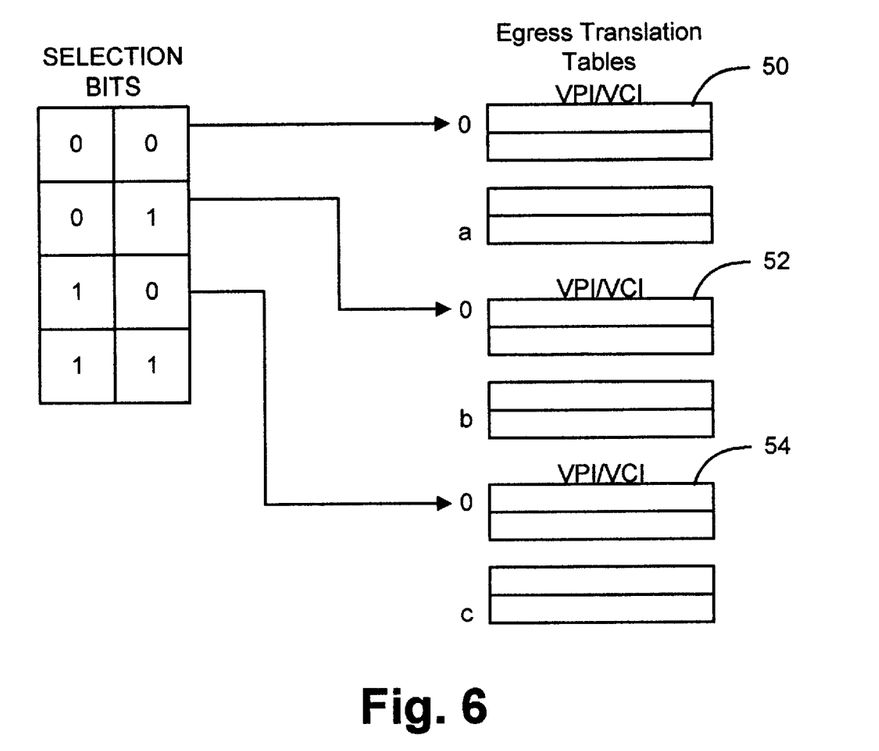
FIG. 6 is a pictorial diagram illustrating the use of selection bits to select one of a plurality of independent memories, each of which contains an egress translation table for look-up of destination addresses for a particular connection identifier type.

FIG. 6 illustrates one embodiment of the invention in which the selection bits are utilized to enable or select one of a plurality of memories. Each of the selectable memories is independently sizable and contains an egress translation table. Each of the egress translation tables comprises a lookup table containing VPI/VCI addresses associated with one connection identifier type (i.e. CIDs, MIDs or RIDs) and is indexed by the respective connection identifier. More specifically, if the selection bits received by the egress address translator equal "00", a first memory 50 having a plurality of storage locations 0–a, containing a CID egress translation table, is used to map the internal CID connection identifier to the outgoing VPI/VCI address for the respective cell. The CID connection identifier contained within the translated cell header illustrated in FIG. 4 is used as an index into the memory 50.

Similarly, if the selection bits equal "01", a second memory 52 having a plurality of storage locations 0–b, and containing a RID egress translation table, is used to map the internal RID connection identifier to the outgoing VPI/VCI address for the respective cell. As noted previously, one of the Output Modules associated with a RID is identified as an active module and the other is identified as inactive. Output Modules which are designated to receive redundant unicast cells may be identified as active and inactive on a circuit by circuit basis by including an active/inactive bit within the egress address table for the redundant unicast cells which defines the Output Module as being active or inactive for the respective RID. The redundant unicast cell would thus be forwarded out of the Output Module designated as active by the active/inactive bit and would not be forwarded out of the Output Module designated as inactive by the active/inactive bit. The active Output Module thus uses the RID contained in the translated cell header as an index into the RID egress translation table to locate the VPI/VCI address to be inserted into the ATM cell header for the respective cell prior to transmission over the corresponding communication link.

Finally, in the illustrative example, if the selection bits equal "10", a third memory 54 having a plurality of storage locations 0–c, and containing a MID egress translation table, is used to map the internal MID connection identifier to two or more outgoing VPI/VCIs for the respective cell. The MID contained in the translated cell header is employed as an index into the third memory 54 to obtain the outgoing VPI/VCI(s) for all copies of the cell to be transmitted out of selected ports of the respective Output Module 14.

Figure 7:
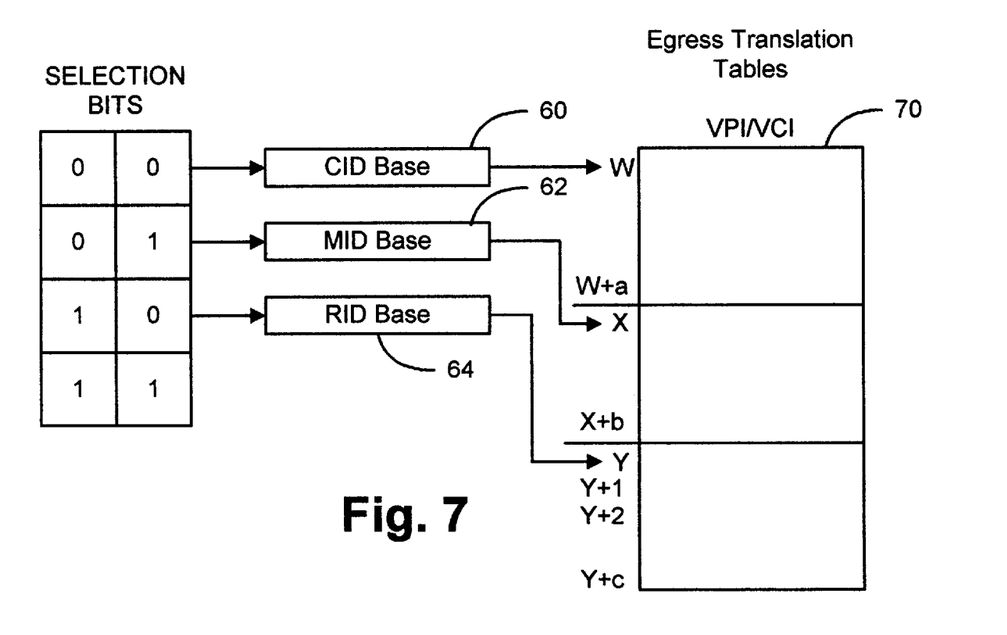
FIG. 7 is a pictorial diagram illustrating another technique for flexibly sizing egress address translation tables employing base plus offset addressing and more specifically, illustrating the use of selection bits to specify a base or starting address within a memory for each one of a plurality of connection identifier types and further illustrating the use of the connection identifier within the modified cell header as an offset from the respective base address within the memory table to locate the applicable VPI/VCI destination address.

In another embodiment of the invention illustrated in FIG. 7, the selection bits within the translated cell header are employed to select one of a plurality of base offset registers which in turn are used to locate one of a corresponding plurality of egress translation tables within a memory 70. More specifically a CID base offset register 60, MID base offset register 62 and RID base offset register 64 contain pointers to locations W, X and Y respectively within a memory 70. If the selection bits equal "00", the respective VPI/VCI address is retrieved by indexing into the portion of the memory between W and W+a, which comprises a CID egress translation table, using the CID contained within the modified cell header as an offset from address W. The VPI/VCI address thus obtained is inserted into the appropriate location of the ATM cell header prior to transmission of the respective cell over the corresponding communication link.

Additionally, if the selection bits equal 01, as depicted in FIG. 7, the contents of the MID base offset register 62 are employed as a pointer to identify the first location of the MID egress translation table (address X) extending from address X to address X+b in the memory 70. The MID connection identifier contained in the modified cell header, such as illustrated in FIG. 4, is employed as a further offset to specify the appropriate VCI/VCI address for the first multicast cell to be transmitted out of one of the ports of the respective output Module. A predetermined number of table locations may be assigned to each multicast connection identifier to accommodate the possibility of a multicast transmission to all ports of an Output Module or alternatively, multicast circuit identifiers may be mapped in multicast egress translation tables as disclosed in application Ser. No. 08/919,840 titled Efficient Multicast Mapping in a Network Switch, filed on the same date as the present application and assigned to the same assignee as the present application, which application is incorporated herein by reference.

Lastly, if the selection bits within the translated cell header equal 10, the contents of the RID base offset register 64 are employed as a pointer to identify the first location of the RID egress translation table (address Y) which table extends from address Y to address Y+c in the memory 70. The RID connection identifier contained in the translated cell header, such as illustrated in FIG. 4, is employed as a further offset from the RID base address Y, to specify the appropriate VCI/VCI address to obtain the redundant unicast cell to be transmitted out the selected port of the respective Output Module if the respective Output Module is designated as the active Output Module.

In the above described manner by utilizing base offset registers, the various egress translation tables may be independently sized and arbitrarily located in memory, thereby permitting the tables to be optimally configured to suit the operating needs in any particular environment. More specifically, addressing is sufficiently flexible to permit the size of the egress translation table for each connection identifier type to be increased or decreased while maintaining the sizes of egress translation tables for other connection identifier types.

While the present description depicts a network switch having four (4) input modules, four (4) output modules and a 4×4 crossbar switch for purposes of discussion and explanation, it should be appreciated that any desired number of input and output modules may be employed with a suitable switch fabric. Thus, n input and output modules may be employed in conjunction with an n×n switch fabric.

Additionally, while four (4) ports are illustrated for purposes of discussion, each input and output module may have any desired number of ports.

Additionally, while the presently disclosed network switch 10 has been depicted as having separate input and output modules 12 and 14 for purposes of explanation, oftentimes input and output functions are combined on a single Input Output Module (IO Module) and the presently disclosed invention is equally applicable to switches partitioned with Input and Output Module functions provided on a single printed circuit card.

Finally, the number of bits comprising the selection bits may be specified to accommodate any number of connection identifier types and the number of bits comprising the connection identifier within the modified cell header may be larger or small than the sixteen bit connection identifier depicted in the illustrative cell header of FIG. 4.

It will be appreciated by those of ordinary skill in the art that other variations of and modifications to the presently disclosed method and apparatus for accessing egress translation tables in a network switch may be employed without departing from the inventive concepts disclosed herein. Accordingly, the invention is not to be viewed as limited except by the scope and spirit of the appended claims.

What is claimed is:

1. A method for selecting a destination address from a table for use in forwarding a data unit over a communication link from an output module of a network device, wherein said network device comprises a plurality of input modules for receiving data units, a plurality of output modules for forwarding data units and a switch fabric for selectively forwarding data units received at respective ones of said input modules to at least one of said output modules, and wherein each of said input and output modules has at least one input port and one output port, comprising the steps of:

receiving a data unit at one of said output modules having a modified header portion and a payload portion, said modified header portion comprising:

a first field comprising a plurality of bits for identifying the data unit as being of one connection identifier type out of a plurality of possible connection identifier types; and a second field comprising a connection identifier for associating the respective data unit with one connection out of a plurality of possible connections for said connection identifier type defined by said first field;

in a first selecting step, selecting one of a plurality of tables in response to said first field, wherein at least some of said tables contain at least one entry comprising a destination address associated with said connection identifier for the respective connection identifier type specified by said first field;

in a second selecting step, selecting one of said at least one entry to obtain a destination address by utilizing said connection identifier within said header portion as an index into said table selected in said first selecting step;

modifying said modified data unit header to form an outgoing data unit header having an outgoing data unit header format;

inserting said destination address into said data unit header having said outgoing data unit header format;

transmitting said data unit comprising said data unit header having said outgoing data unit header format and said payload information out of said network device over said communication link.

2. The method of claim 1 wherein said first selecting step further comprises the steps of:

storing each one of said plurality of tables in an independently addressable and sizeable memory; and selecting one of said tables stored in the respective one of said plurality of memories based upon the contents of said first field.

3. The method of claim 2 wherein said connection identifier type identifies said data unit as being one of a unicast data unit and a multicast data unit.

4. The method of claim 2 wherein said connection identifier type identifies said data unit as being one of a unicast data unit, a multicast data unit and a redundant unicast data unit.

5. The method of claim 4 wherein said transmitting step comprises the step of transmitting said data unit out of said network device over said communication link in an Asynchronous Transfer Mode (ATM) cell format.

6. The method of claim 5 wherein said destination address comprises a VPI/VCI address.

7. The method of claim 1 wherein said each of said plurality of input modules is combined with one of said plurality of output modules on a single printed circuit card to form a plurality of input output modules.

8. The method of claim 1 wherein first selecting step further comprises the steps of:

storing each of said plurality of tables in respective portions of a memory;

storing a plurality of address pointers in a corresponding plurality of storage registers, wherein each of said plurality of address pointers points to one of said portions of said memory containing one of said plurality of tables;

selecting one of said plurality of storage registers based upon the contents of said first field to obtain a pointer to one of said plurality of tables within said memory; and selecting one of said plurality of tables based upon the value of said pointer within said selected storage register.

9. The method of claim 8 wherein said connection identifier type identifies said data unit as being one of a unicast data unit and a multicast data unit.

10. The method of claim 8 wherein said connection identifier type identifies said data unit as being one of a unicast data unit, a multicast data unit and a redundant unicast data unit.

11. The method of claim 9 wherein said transmitting step comprises the step of transmitting said data unit out of said network device over said communication link in an Asynchronous Transfer Mode (ATM) cell format.

12. The method of claim 11 wherein each of said destination addresses comprises a VPI/VCI address.

13. A method for selecting a destination address from a table for use in forwarding a data unit over a communication link from an output module of a network device, wherein said network device comprises a plurality of input modules for receiving data units, a plurality of output modules for forwarding data units and a switch fabric for selectively forwarding data units received at respective ones of said input modules to at least one of said output modules, wherein each of said input modules has at least one input port and each of said output modules has at least one output port, said method comprising the steps of:

receiving a data unit associated with a connection identifier at one input port of one of said plurality of input modules of said network device, wherein said data unit has a first data unit format and said data unit comprises a data unit header and payload information;

modifying said data unit header to form a modified data unit header which includes a first field defining said received data unit as being of one connection identifier type of a plurality of connection identifier types and a second field containing said connection identifier;

forwarding said modified data unit header and said payload information through said switch fabric to at least one of a plurality of output modules;

selecting one output table out of a plurality of tables based upon the contents of said first field;

obtaining an output destination address from the selected one of said plurality of tables using said connection identifier contained within said second field as an index into said selected table;

inserting said destination address obtained from said selected table into an outbound data unit header; and transmitting said outbound data unit header and said payload information in said first data unit format from said network device over a communication link for receipt by another network device.

14. The method of claim 13 further including the step of prepending said modified data unit header to said payload information prior to said forwarding step.

15. The method of claim 13 wherein said first selecting step further comprises the steps of:

storing each one of said plurality of tables in an independently addressable and sizeable memory; and selecting one of said tables stored the respective one of said plurality of memories based upon the contents of said first field.

16. The method of claim 15 wherein said connection identifier type identifies said data unit as being one of a unicast data unit and a multicast data unit.

17. The method of claim 15 wherein said connection identifier type identifies said data unit as being one of a unicast data unit, a multicast data unit and a redundant unicast data unit.

18. The method of claim 13 wherein each data unit comprises an Asynchronous Transfer Mode (ATM) cell and said first data unit format comprises an Asynchronous Transfer Mode (ATM) format.

19. The method of claim 18 wherein said destination address comprises a VPI/VCI address.

20. The method of claim 13 wherein said first selecting step further comprises the steps of:

storing each of said plurality of tables in respective portions of a memory;

storing a plurality of address pointers in a corresponding plurality of storage registers, wherein each of said plurality of address pointers points to one of said portions of said memory containing one of said plurality of tables;

selecting one of said plurality of storage registers based upon the contents of said first field to obtain a pointer to one of said plurality of tables within said memory; and selecting one of said plurality of tables based upon the value of said pointer within said selected storage register.

21. The method of claim 20 wherein said connection identifier type identifies said data unit as being one of a unicast data unit and a multicast data unit.

22. The method of claim 20 wherein said connection identifier type identifies said data unit as being one of a unicast data unit, a multicast data unit and a redundant unicast data unit.

23. The method of claim 21 wherein said receiving step comprises the step of receiving a data unit associated with a connection identifier in an Asynchronous Transfer Mode (ATM) cell format and said transmitting step comprises the step of transmitting said data unit out of said network device over said communication link in an Asynchronous Transfer Mode (ATM) cell format.

24. The method of claim 23 wherein each of said destination addresses comprises a VPI/VCI address.

25. A method for selectively forwarding data units from a network device comprising a plurality of input modules, a plurality of output modules, and a switch fabric for selectively forwarding data units received from said input modules to selected ones of said output modules, comprising the steps of:

receiving a data unit at one input module of said network switch;

identifying said received data unit as a data unit of at least a first type corresponding to a unicast data unit type, a second type corresponding to a multicast data unit type, or a third type corresponding to a redundant data unit type;

in the event said data unit comprises a data unit of said third type, forwarding said data unit from said input module through said switch fabric to at least two output modules of said network device;

identifying one of said two output modules as the active output module and the other ones of said at least two output modules as the inactive module for purposes of forwarding said data unit from said network switch;

transmitting said data unit only from the output module of said network device which is identified as the active output module.

26. The method of claim 25 further comprising the steps of:

deactivating said active output module for purposes of data unit forwarding to prevent the forwarding of said data unit from said formerly active output module;

activating said inactive output module for purposes of data unit forwarding to permit the forwarding of said data unit from said formerly inactive output module; and transmitting said data unit from said activated output module.

27. The method of claim 25, wherein said received data unit is an asynchronous transfer mode cell.

* * * * *